(12) United States Patent
Lee et al.

(10) Patent No.: US 10,328,619 B2
(45) Date of Patent: Jun. 25, 2019

(54) PROTECTION FILM AND METHOD FOR MANUFACTURING THE SAME

(71) Applicant: SAMSUNG DISPLAY CO., LTD., Yongin-si, Gyeonggi-do (KR)

(72) Inventors: Kang-Yong Lee, Seoul (KR); HwanJin Kim, Hwaseong-si (KR)

(73) Assignee: Samsung Display Co., Ltd., Yongin-si (KR)

(*) Notice: Subject to any disclaimer, the term of this patent is extended or adjusted under 35 U.S.C. 154(b) by 275 days.

(21) Appl. No.: 14/920,799

(22) Filed: Oct. 22, 2015

(65) Prior Publication Data

US 2016/0236382 A1  Aug. 18, 2016

(30) Foreign Application Priority Data

Feb. 16, 2015  (KR) .................. 10-2015-0023574

(51) Int. Cl.
| | |
|---|---|
| B29C 44/08 | (2006.01) |
| B29C 44/34 | (2006.01) |
| B29K 23/00 | (2006.01) |
| B29K 75/00 | (2006.01) |
| B29L 9/00 | (2006.01) |

(52) U.S. Cl.
CPC .......... *B29C 44/08* (2013.01); *B29C 44/3484* (2013.01); *B29C 44/355* (2013.01); *B29K 2023/04* (2013.01); *B29K 2023/10* (2013.01); *B29K 2075/00* (2013.01); *B29K 2995/0018* (2013.01); *B29K 2995/0025* (2013.01); *B29K 2995/0063* (2013.01); *B29L 2009/00* (2013.01)

(58) Field of Classification Search
CPC ..................................................... B29C 44/08
See application file for complete search history.

(56) References Cited

U.S. PATENT DOCUMENTS

| | | | |
|---|---|---|---|
| 5,753,900 A | 5/1998 | Goodwin, III et al. | |
| 8,466,613 B2 | 6/2013 | Yee | |
| 2009/0079904 A1 | 3/2009 | Yada et al. | |
| 2013/0294043 A1 | 11/2013 | Ogura et al. | |
| 2015/0030839 A1* | 1/2015 | Satrijo ................. | C09J 133/08 |
| | | | 428/220 |

FOREIGN PATENT DOCUMENTS

| | | |
|---|---|---|
| CN | 101398543 A | 4/2009 |
| CN | 103270547 A | 8/2013 |
| CN | 104050892 A | 9/2014 |
| CN | 204010551 U | 12/2014 |

(Continued)

OTHER PUBLICATIONS

Abstract for Korean Publication No. 20130061697 A, Jun. 11, 2013, Corresponding to Korean Patent No. 10-1358841 B1, Feb. 6, 2014, 1 Page.

*Primary Examiner* — Larry W Thrower
(74) *Attorney, Agent, or Firm* — Lewis Roca Rothgerber Christie LLP

(57) ABSTRACT

A method of manufacturing a protection film includes performing a first foaming of a first part of a base material on a substrate to form a bumper layer having first bubbles foamed with a first foaming ratio, and performing a second foaming of a second part of the base material to form a light blocking layer having second bubbles foamed with a second foaming ratio.

15 Claims, 8 Drawing Sheets

(56) References Cited

FOREIGN PATENT DOCUMENTS

| | | |
|---|---|---|
| JP | 2003-330377 A | 11/2003 |
| JP | 2006-24500 A | 1/2006 |
| JP | 2014-512668 A | 5/2014 |
| KR | 10-2008-0061462 A | 7/2008 |
| KR | 10-1358841 B1 | 2/2014 |
| MY | 122026 A | 3/2006 |
| WO | WO 2013/155362 | * 10/2013 |

* cited by examiner

PROTECTION FILM AND METHOD FOR MANUFACTURING THE SAME

CROSS-REFERENCE TO RELATED APPLICATION

This patent application claims priority to and the benefit of Korean Patent Application No. 10-2015-0023574, filed on Feb. 16, 2015, the entire content of which is hereby incorporated by reference.

BACKGROUND

The present disclosure herein relates to a protection film and a method for manufacturing the same, and more particularly, to a protection film, which is capable of being manufactured through reduced process cost and time, and a method for manufacturing the same.

Various display panels such as liquid crystal display panels, organic light emitting display panels, electrowetting display panels, and electrophoretic display panels have been developed in recent years. These display panels are used in various electronic devices such as smart phones, digital cameras, notebook computers, and navigation systems.

A protection film for protecting a display panel against an external impact is attached to at least one surface of the display panel.

SUMMARY

Aspects of embodiments of the present disclosure are directed to a protection film capable of being manufactured through reduced process cost and time, and a method for manufacturing the same.

According to embodiments of the present inventive concept, there is provided a method of manufacturing a protection film including: performing a first foaming of a first part of a base material on a substrate to form a bumper layer having first bubbles foamed with a first foaming ratio; and performing a second foaming of a second part of the base material to form a light blocking layer having second bubbles foamed with a second foaming ratio.

In an embodiment, the performing of the first foaming includes heating the first part at a first temperature, and the performing of the second foaming includes heating the second part at a second temperature different from the first temperature.

In an embodiment, the first part includes a top surface of the base material, the second part includes a bottom surface of the base material, and the performing of the first foaming includes providing heat corresponding to the first temperature to the first part, and the performing of the second foaming includes providing heat corresponding to the second temperature to the second part.

In an embodiment, the method further includes forming an EMBO pattern on a bottom surface of the second part, wherein the second part is between the first part and the substrate.

In an embodiment, the performing of the first foaming includes performing first curing the first part, and wherein the performing of the second foaming includes performing second curing the second part, wherein the performing of the first curing includes heating the first part to a third temperature, and wherein the performing of the second curing includes heating the second part to a fourth temperature different from the third temperature.

In an embodiment, a top surface of the substrate includes a mold corresponding to the EMBO pattern, and the forming of the EMBO pattern is performed by casting a bottom surface of the second part by using the mold during the performing of the second curing.

In an embodiment, the bumper layer has a first density, and the light blocking layer has a second density different from the first density.

In an embodiment, the first density is less than the second density.

In an embodiment, the first foaming ratio is greater than the second foaming ratio.

In an embodiment, an average volume of the first bubbles is greater than that of the second bubbles.

In an embodiment, the first temperature is greater than the second temperature.

In an embodiment, a transmittance of the light blocking layer is less than that of the bumper layer.

In an embodiment, the light blocking layer has transmittance of about 10% or less.

In an embodiment, the method further includes injecting a foaming gas into the base material, wherein the performing of the first and second foamings use expansion of the foaming gas.

In an embodiment, the foaming gas includes an inert gas.

According to embodiments of the present inventive concept, there is provided a protection film, including: a base having first bubbles formed therein to correspond to a first area, and second bubbles formed therein to correspond to a second area, the first bubbles being foamed with a first foaming ratio, and the second bubbles being foamed with a second foaming ratio less than the first foaming ratio.

In an embodiment, a first portion of the base corresponding to the first area has a density greater than that of a second portion of the base corresponding to the second area.

In an embodiment, the second portion of the base corresponding to the second area has a density of about 0.1 g/cm$^3$ to about 0.5 g/cm$^3$, and the first portion of the base corresponding to the first area has a density of about 1 g/cm$^3$ to about 1.5 g/cm$^3$.

In an embodiment, one surface of the base corresponding to the second area includes an EMBO pattern fixed to a rear surface of a display panel.

In an embodiment, the base includes at least one of polyurethane, polyethylene, and polypropylene.

BRIEF DESCRIPTION OF THE DRAWINGS

The accompanying drawings are included to provide a further understanding of the present inventive concept, and are incorporated in and constitute a part of this specification. The drawings illustrate exemplary embodiments of the present inventive concept and, together with the description, serve to explain principles of the present inventive concept. In the drawings.

DETAILED DESCRIPTION

Figure 1:
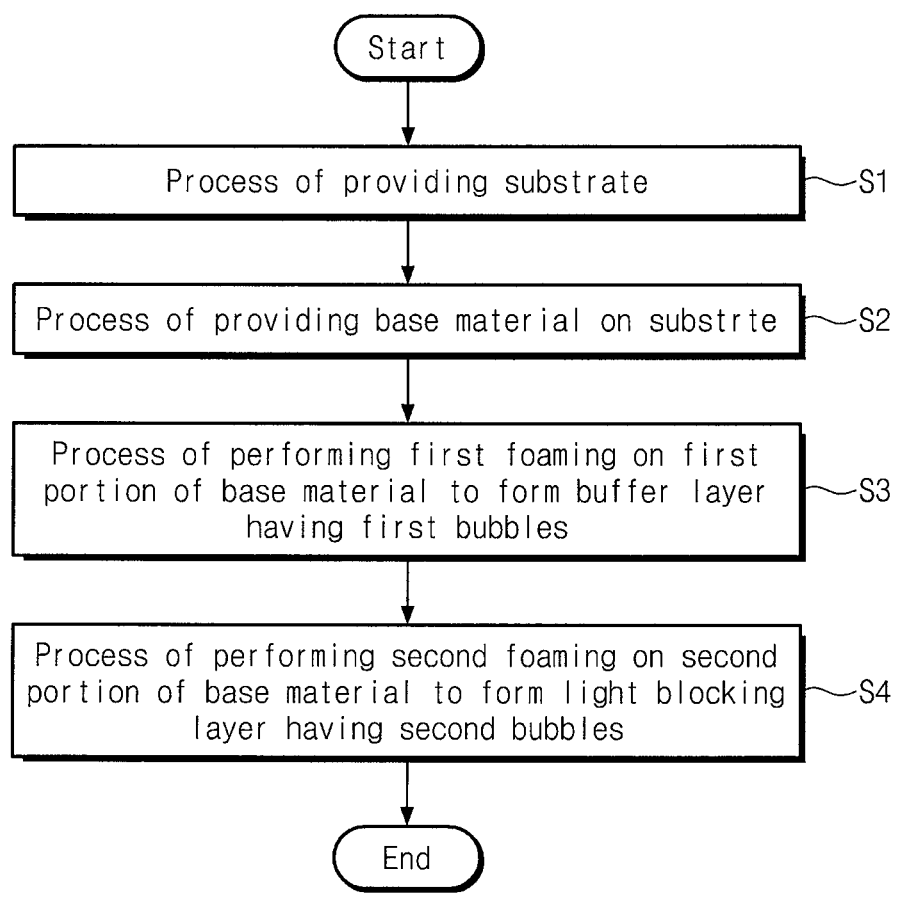
FIG. 1 is a flow diagram illustrating a process for manufacturing a protection film according to an embodiment of the present inventive concept.

Hereinafter, specific embodiments will be described in detail with reference to the accompanying drawings. The present disclosure may, however, be embodied in different forms and various modifications and variations can be made in the present disclosure. The present disclosure should not be construed as being limited to the embodiments set forth herein and should be understood to include the structural and functional equivalents of the matter.

Like reference numerals refer to like elements throughout. In the figures, the dimensions of layers and regions are exaggerated for clarity of illustration.

Hereinafter, exemplary embodiments will be described in detail with reference to the accompanying drawings.

Figure 2:
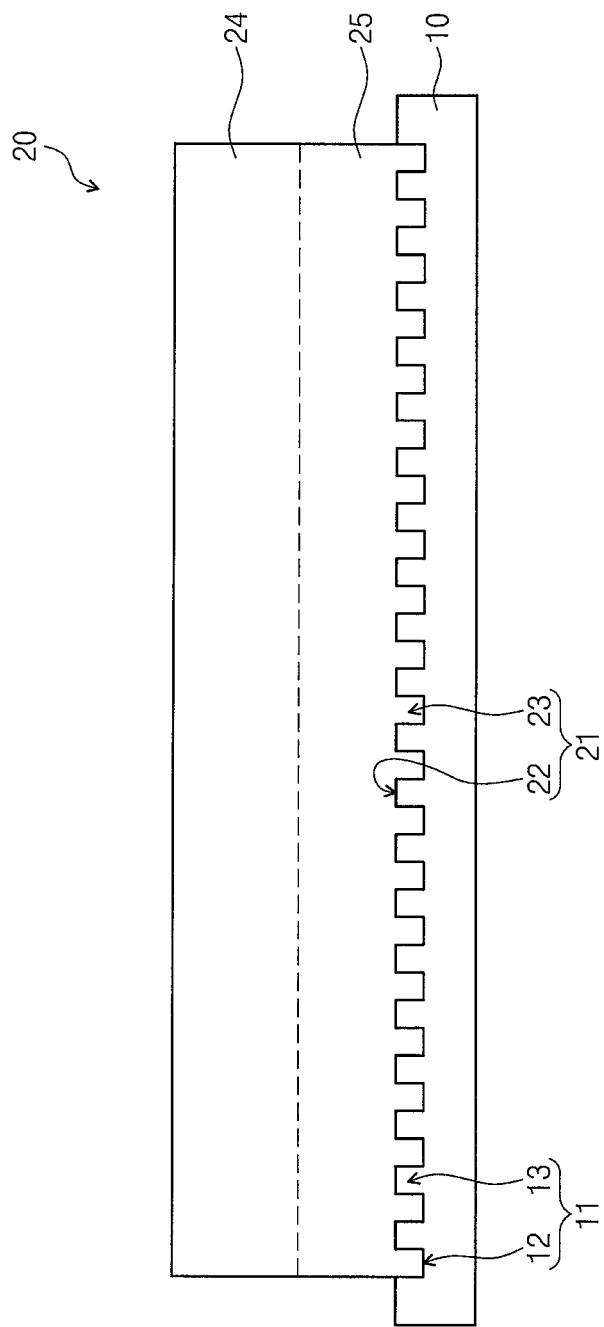
FIG. 2 is a schematic diagram illustrating operations S1 and S2 shown in FIG. 1.
Figure 3:
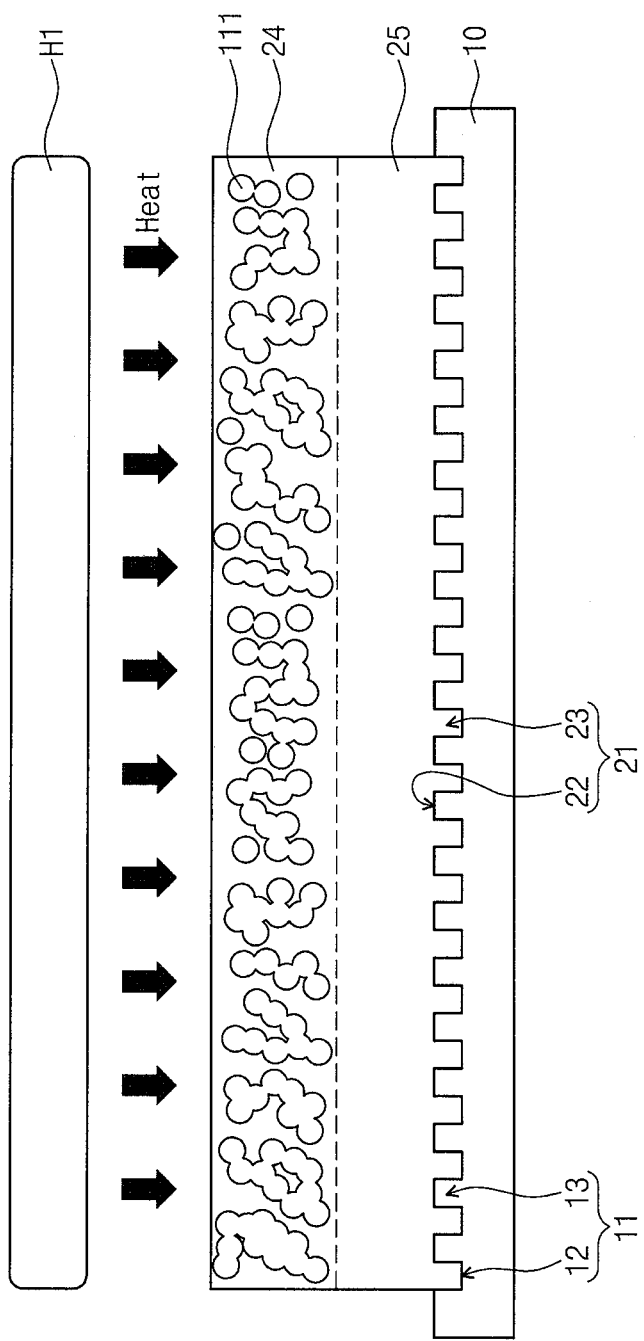
FIG. 3 is a schematic diagram illustrating operation S3 shown in FIG. 1.
Figure 4:
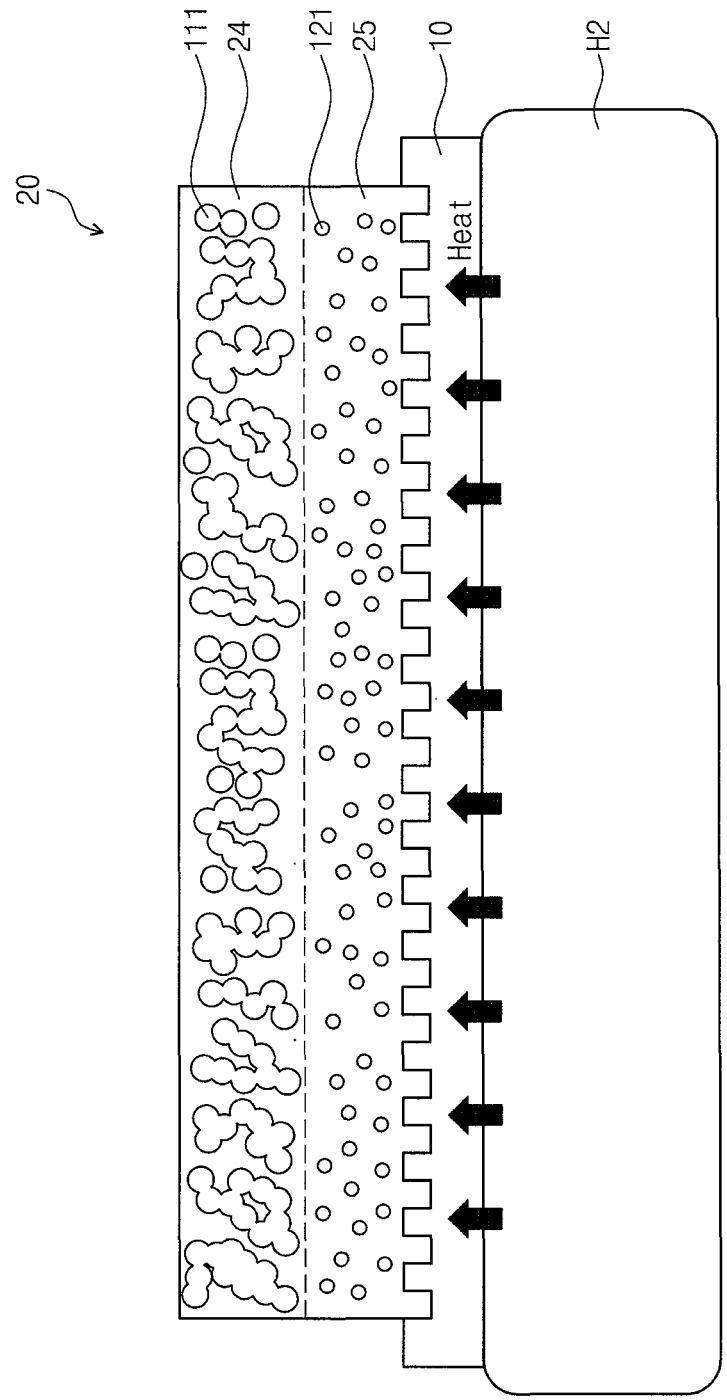
FIG. 4 is a schematic diagram illustrating operation S4 shown in FIG. 1.

FIG. 1 is a flow diagram illustrating a process for manufacturing a protection film according to an embodiment of the present inventive concept. FIG. 2 is a schematic diagram illustrating operations S1 and S2 shown in FIG. 1. FIG. 3 is a schematic diagram for illustrating operation S3 shown in FIG. 1. FIG. 4 is a schematic diagram illustrating operation S4 shown in FIG. 1.

Referring to FIGS. 1 and 2, in operation S1, a substrate 10 is provided. The substrate 10 may be, for example, a glass substrate. In an example, the substrate 10 may be a flexible substrate made of a transparent polymer resin. A mold 11 is disposed on a top surface of the substrate 10. For example, the mold 11 may have an uneven shape defined by first grooves 12 recessed to a bottom surface of the substrate 10 and second protrusions 13 defined between the first grooves 12.

In operation S2, a base material 20 is provided on the top surface of the substrate 10. According to an embodiment of the present inventive concept, the base material 20 may include a solvent and a polymer resin dissolved in the solvent. In an embodiment, the base material 20 is a foamable polymer resin. For example, the base material 20 may include at least one of polyurethane, polyethylene, polypropylene, and the like. In an example, the polymer resin may be optically opaque.

A foaming gas for foaming the base material 20 may be injected into the base material 20. The foaming gas may be injected into the base material 20 by adjusting a surrounding temperature and pressure of the foaming gas. For example, the foaming gas may include an inert gas such as nitrogen. In an example, the foaming gas may include carbon dioxide. The foaming gas may be uniformly dispersed into the base material 20.

The base material 20 may be applied at a uniform thickness on the top surface of the substrate 10. For example, the base material 20 may be applied on the top surface of the substrate 10 by using a slit coater or spin coater.

Hereinafter, for convenience of explanation, the base material 20 is divided into a first part 24 and a second part 25. The first part 24 may be an upper portion of the base material 20 and include a top surface of the base material 20. The second part 25 may be a lower portion of the base material 20 and include a bottom surface of the base material 20. The second part 25 is disposed between the first part 24 and the substrate 10.

As the base material 20 is applied onto the top surface of the substrate 10, the top surface of the first part 24 is exposed to the outside (and e.g., faces away from the substrate 10), and an EMBO pattern (an embossed pattern) 21 corresponding to the uneven shape of the mold 11 may be formed on a bottom surface of the second part 25. For example, the EMBO pattern 21 may have an uneven shape defined by second grooves 22 recessed to a top surface of the second part 25 and second protrusions 23 defined between the second grooves 22.

Thereafter, as illustrated in FIG. 3, first foaming is performed on the first part 24 of the base material 20.

In an embodiment, a first heater H1 is disposed above the first part 24. The first heater H1 may heat the first part 24 to adjust a temperature of the first part 24. The first heater H1 may be disposed to be spaced a distance (e.g., a predetermined distance) from the first part 24. The first part 24 is heated to a first temperature by the heat provided from the first heater H1. For example, the first temperature may be approximately 100° C.

When the first part 24 is heated to the first temperature, the first foaming is performed on the first part 24 by the foaming gas injected into the first part 24. For example, as the first part 24 is maintained at the first temperature for about 20 minutes to about 50 minutes, the foaming gas is expanded, and first bubbles are formed within the first part 24 by the expanded foaming gas.

As the first foaming is performed on the first part 24, a bumper layer (see reference numeral 110 of FIG. 5) may be formed from the first part 24.

For example, a process of performing the first foaming on the first part 24 may include a process of performing first curing on the first part 24. In an embodiment, the first curing may be performed on the first part 24 by adjusting a temperature of the first part 24 by using the first heater H1. For example, as the first part 24 is maintained at a third temperature for about 20 minutes to about 50 minutes, the first curing may be performed on the first part 24. For example, the third temperature may be approximately 150° C.

The first foaming ratio of the first bubbles 111 and a first density of the bumper layer 110 based on the first foaming ratio may be determined by the diameter (e.g., the average diameter) and density of the first bubbles 111, and the diameter (e.g., the average diameter) and density of the first bubbles 111 may be adjusted by the first foaming and first curing processes.

For example, the first bubbles 111 may have an open-cell structure. In an embodiment, most of the first bubbles 111 are connected to adjacent ones of the first bubbles 111. As a result, a passage passing through at least two first bubbles 111 of the first bubbles 111 may be formed in the bumper layer 110.

Thereafter, as illustrated in FIG. 4, second foaming is performed on the second part 25 of the base material 20.

For example, a second heater H2 is disposed below the second part 25. The second heater H2 may heat the second part 25 to adjust a temperature of the second part 25. The second heater H2 may have a top surface contacting the bottom surface of the substrate 10 and transfer heat to the second part 25 through the substrate 10. Accordingly, the second part 25 is heated to a second temperature by the heat provided from the second heater H2.

While the second temperature is less than the first temperature, according to some examples, the present disclosure is not limited thereto. For example, the second temperature may be approximately 80° C.

When the second part 25 is heated to the second temperature, the second foaming is performed on the second part 25 by the foaming gas injected into the second part 25. For example, when the second part 25 is maintained at the second temperature for about 20 minutes to about 50 minutes, the foaming gas is expanded, and second bubbles 121 are formed within the second part 25 by the expanded foaming gas.

As the second foaming process is performed on the second part 25, a light blocking layer (see reference numeral 120 of FIG. 5) is formed from the second part 25.

For example, a process of performing the second foaming on the second part may include a process of performing second curing on the second part 25. For example, the second curing may be performed on the second part 25 by adjusting a temperature of the second part 25 by using the second heater H2. For example, as the second part 25 is maintained at a fourth temperature for about 20 minutes to about 50 minutes, the second curing may be performed on the second part 25. Although, in an embodiment, the fourth temperature is less than the third temperature, the present disclosure is not limited thereto. For example, the third temperature may be equal to or greater than the fourth temperature.

The second foaming ratio of the second bubbles 121 and a second density of the light blocking layer 120 based on the second foaming ratio are determined by a diameter and density of the second bubbles 121, and the diameter and density of the second bubbles 121 may be adjusted by the second foaming and second curing.

For example, the second bubbles 121 have a close-cell structure. In an embodiment, the second bubbles 121 are not connected to the adjacent second bubbles 121, and each of the second bubbles 121 has an approximately spherical closed outer surface. Accordingly, a passage passing through at least two or more second bubbles 121 of the second bubbles 121 may not be formed in the light blocking layer 120.

Although the first and second foaming processes are described in order, the present disclosure is not limited thereto. For example, the first and second foaming may be concurrently (e.g., simultaneously) performed. When the first and second foaming are concurrently (e.g., simultaneously) performed, a boundary between areas where the first and second bubbles 111 and 121 are formed may be more exactly controlled because the first and second parts 24 and 25 of the base material 20 are concurrently (e.g., simultaneously) heated to the first and second temperatures, respectively. In an example, the first and second curing may be concurrently (e.g., simultaneously) performed.

Figure 5:
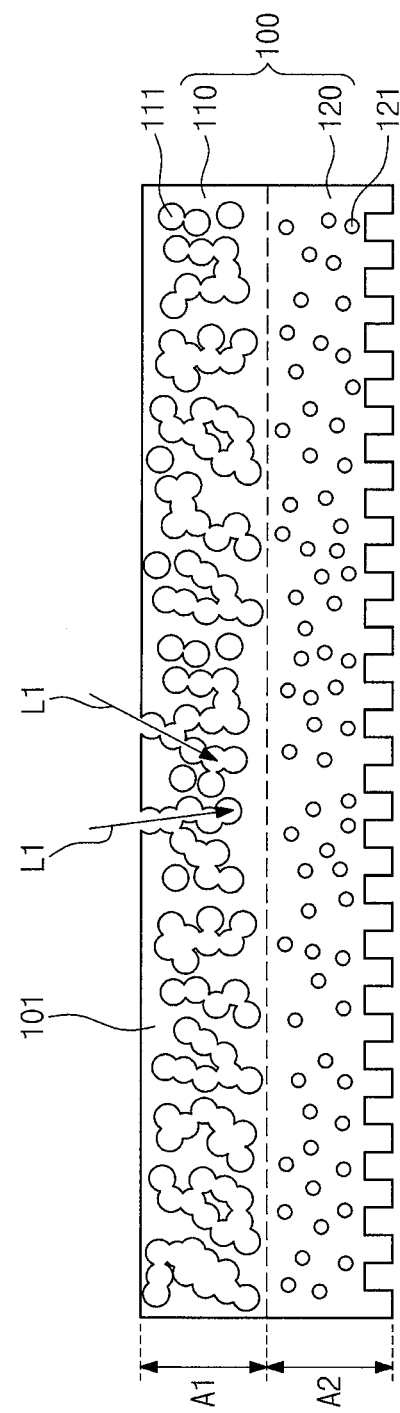
FIG. 5 is a schematic diagram illustrating the protection film according to an embodiment of the present inventive concept.

FIG. 5 is a schematic diagram illustrating a protection film according to an embodiment of the present inventive concept.

According to the above-described processes, as illustrated in FIG. 5, a protection film 100 including the bumper layer 110 and the light blocking layer 120 may be provided. The bumper layer 110 corresponds to a first area A1, and the light blocking layer 120 corresponds to a second area A2.

The bumper layer 110 includes a base 101 and has first bubbles (e.g., first bubble-shaped cavities) 111 foamed within the base 101 with the first foaming ratio, and the light blocking layer 120 includes the base 101 and has second bubbles (e.g., second bubble-shaped cavities) 121 foamed within the base 101 with the second foaming ratio. The base 101 includes the cured polymer resin.

Accordingly, the first bubbles 111 are formed within the base 101 to correspond to the first area A1, and the second bubbles 121 are formed within the base 101 to correspond to the second area A2.

The first foaming ratio is greater than the second foaming ratio. That is, a volume rate of the base 101 and the first bubbles 111 in the bumper layer 110 are greater than those of the base 101 and the second bubbles 121 in the light blocking layer 120. The first bubbles 111 may have an average volume greater than that of the second bubbles 121. For example, each of the first bubbles 111 may have a volume greater than that of each of the second bubbles 121.

The first and second densities are determined according to the first and second foaming ratios. Because the first foaming ratio is greater than the second foaming ratio, the first density is less than the second density. For example, the bumper layer 110 may have a density of about 0.1 $g/cm^3$ to about 0.5 $g/cm^3$, and the light blocking layer 120 may have a density of about 1 $g/cm^3$ to about 1.5 $g/cm^3$.

Because the bumper layer 110 includes the first bubbles 111 having the open-cell structure, the bumper layer 110 may absorb and lessen an impact applied from the outside and effectively act as a bumper. However, when light is illuminated from the outside, the light L may advance along the passage formed within the open-cell structure and thus pass through the bumper layer 110. As a result, the bumper layer 110 may not block the light illuminated from the outside.

On the other hand, because the light blocking layer 120 includes the second bubbles 121 having the close-cell structure, the light blocking layer 120 may not absorb an impact applied from the outside (e.g., may not act as an effective bumper) in comparison to the bumper layer 110. In an example, a passage through which the light passes is not formed within the light blocking layer 120, and the base 101 is optically opaque. Accordingly, the light blocking layer 120 may have transmittance less than that of the bumper layer 110 and block the light illuminated from the outside of the light blocking layer 120. For example, the light blocking layer 120 may have transmittance of 10% or less.

Figure 6:
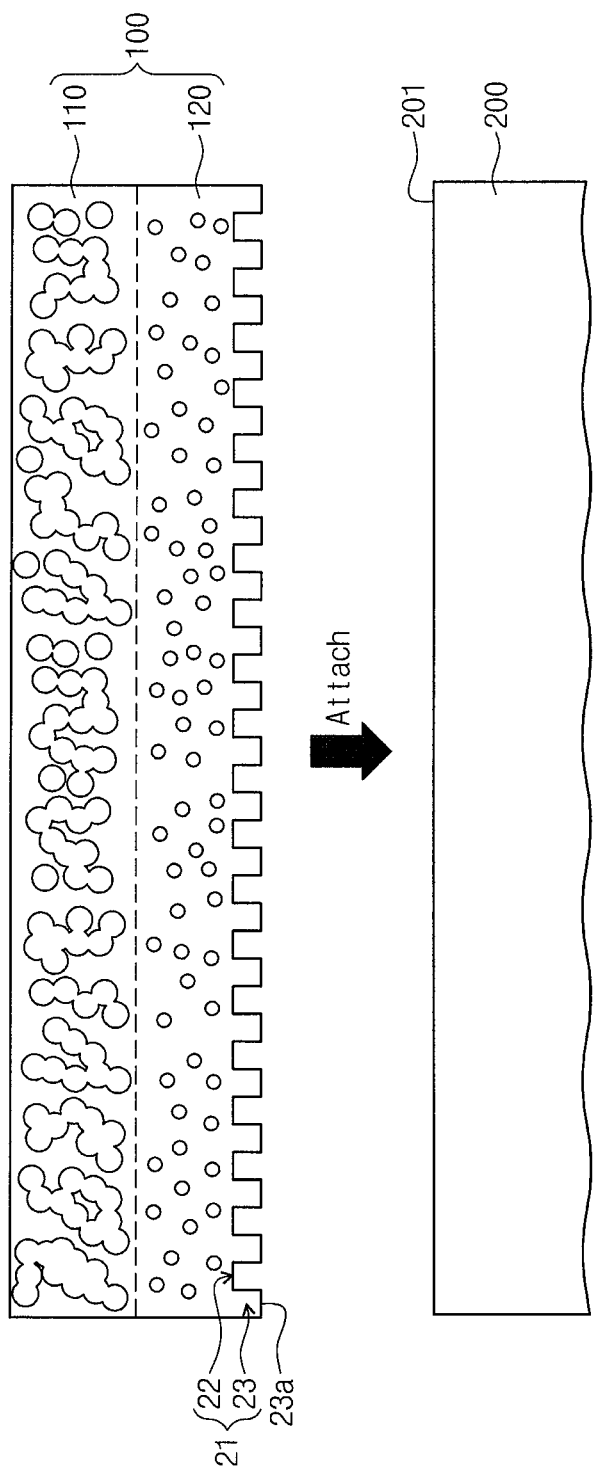
FIG. 6 is a schematic diagram illustrating a process of attaching the protection film, shown in FIG. 5, to the display panel.

FIG. 6 is a schematic diagram illustrating a process of attaching the protection film, shown in FIG. 5, to a display panel.

The protection film 100 may be attached to a rear surface 201 of the display panel 200 as illustrated in FIG. 6. For example, heat is applied to a bottom surface 23a of the second protrusions 23 formed on a bottom surface of the light blocking layer 120. As a result, the bottom surface 23a of the second protrusions 23 has an adhesive property, and the bottom surface 23a having the adhesive property is adhered to the rear surface 201 of the display panel 200 to attach the protection film 100 to the display panel 200. However, the present disclosure is not limited thereto. For example, the protection film 100 may be attached to the display panel 200 through an adhesive film disposed between the second protrusions 23 and the display panel 200.

The EMBO pattern 21 may prevent or substantially prevent bubbles from being generated between the protection film 100 and the rear surface 201 of the display panel 200 when the protection film 100 is attached to the rear surface 201 of the display panel 200.

When the protection film 100 is manufactured through the manufacturing method according to an embodiment of the present inventive concept, the bumper layer 110 absorbing an external impact and the light blocking layer 120 blocking light may be formed by using one material. Accordingly, an additional adhesion layer for attaching the bumper layer 110 and the light blocking layer 120, which is used when the bumper layer 110 and the light blocking layer 120 are separately provided, or an additional process for attaching the bumper layer 110 and the light blocking layer 120 may be omitted. As a result, process time and cost for manufacturing the protection film 100 may be reduced.

Figure 7:
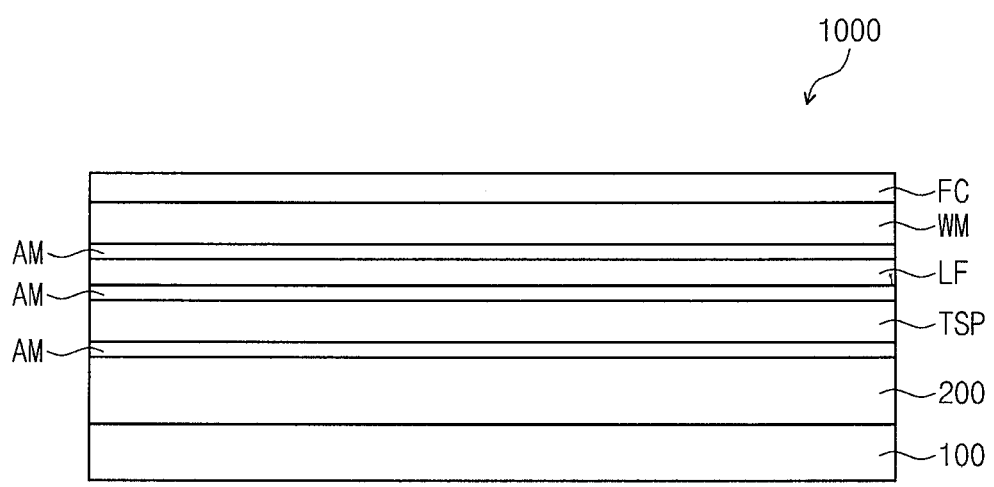
FIG. 7 is a cross-sectional view of the display device to which the protection film is attached according to an embodiment of the present inventive concept.
Figure 8:
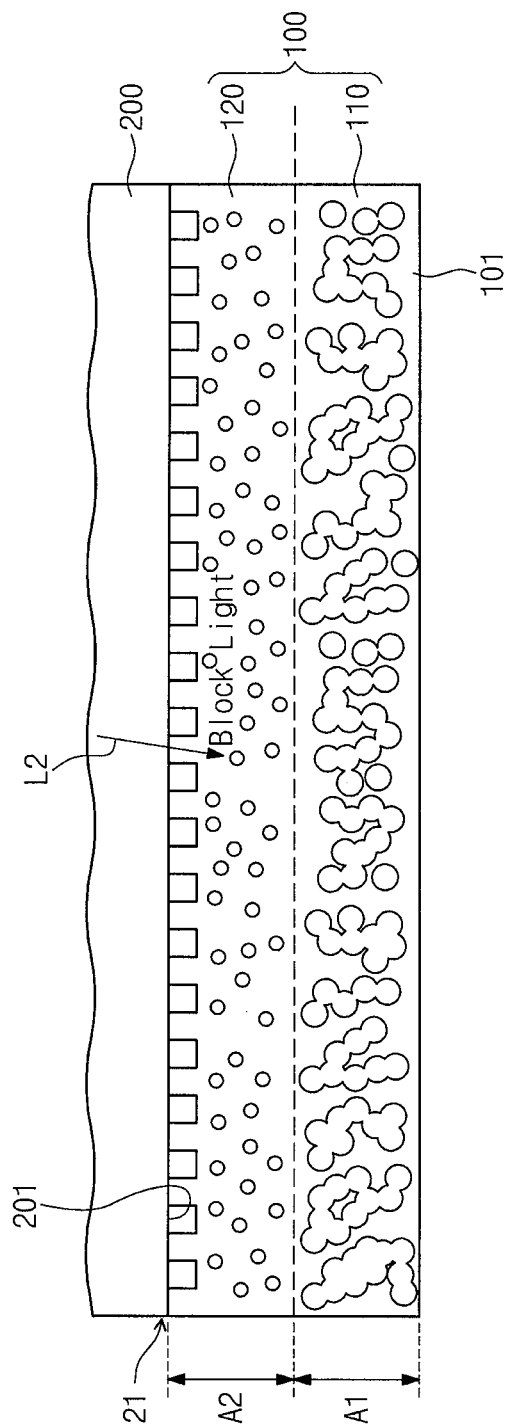
FIG. 8 is an enlarged cross-sectional view of the display panel and the protection film illustrated in FIG. 6.

FIG. 7 is a cross-sectional view of the display device, to which the protection film is attached, according to an embodiment of the present inventive concept. FIG. 8 is an enlarged cross-sectional view of the display panel and the protection film illustrated in FIG. 6.

Hereinafter, a display device 1000 will be described with reference to FIGS. 7 and 8.

According to an embodiment of the present inventive concept, the display device 1000 includes a protection film 100, a display panel 200, a touch screen panel TSP, an optical member LF, a window member WM, and a functional coating layer FC, which are stacked in sequence.

The display panel 200 is capable of displaying an image. For example, the display panel 200 may include an organic light emitting display panel, a liquid crystal display panel, a plasma display panel, an electrophoretic display panel, and an electrowetting display panel.

The touch screen panel TSP is attached to a top surface of the display panel 200. The touch screen panel TSP may be attached to the display panel 200 by an adhesion member AM disposed between the display panel 200 and the touch screen panel TSP. The touch screen panel TSP detects touch with an external object to generate an electric signal corresponded to the detected touch.

The optical member LF may include at least a polarizing plate and a phase difference plate. The optical member LF may prevent or substantially prevent external light from being reflected. The optical member LF may be attached to the touch screen panel TSP by an adhesion member AM disposed between the optical member LF and the touch screen panel TSP. In an embodiment of the present inventive concept, the optical member LF may be omitted and included in the touch screen panel TSP.

The window member WM is disposed on the optical member to protect the display panel 200 from an external impact. The window member WM may be formed of glass or a transparent polymer resin. The window member WM may be attached to the optical member LF through an adhesive member AM disposed between the window member WM and the optical member LF.

The functional coating layer FC is disposed on a top surface of the window member WM. The functional coating layer FC may include at least one of an anti-fingerprint coating layer, an anti-reflection coating layer, an anti-glare coating layer, and a hard coating layer.

The protection film 100 may be the protection film 100 describe with reference to FIGS. 1 to 6. The protection film 100 may be attached to a rear surface 201 of the display panel 200. As illustrated in FIG. 8, the first bubbles 111 is formed within the base 101 to correspond to the first area A1, and the second bubbles 121 are formed within the base 101 to correspond to the second area A2.

The first bubbles 111 and the base 101 disposed on the first area A1 may constitute the light blocking layer 120, and the second bubbles 121 and the base 101 disposed on the second area A2 may constitute the bumper layer 110.

As described above, the EMBO pattern 21 disposed on a bottom surface of the light blocking layer 120 is attached to the rear surface 201 of the display panel 200. Accordingly, the light blocking layer 120 may be generated on the display panel 200 to block light L2 illuminated to the protection film 100. Also, the bumper layer 110 may absorb and lessen an impact applied from the rear of the display panel 200 to protect the display panel 200.

As described above, the first part and second part of the base material are differently foamed with respect to each other to manufacture the protection film including the bumper part and the light blocking part from the base material.

Therefore, the process cost and time for manufacturing the protection film may be reduced.

Although exemplary embodiments of the present inventive concept have been disclosed, various changes and modifications may be made thereto by one skilled in the art without departing from the scope and spirit of the invention as set forth in the appended claims, and equivalents thereof.

Therefore, the detailed description of the present invention does not intend to limit the present invention to the disclosed embodiments.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the present inventive concept.

Spatially relative terms, such as "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the present inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list. Further, the use of "may" when describing embodiments of the present inventive concept refers to "one or more embodiments of the present inventive concept." Also, the term "exemplary" is intended to refer to an example or illustration.

It will be understood that when an element or layer is referred to as being "on", "connected to" or "adjacent to" another element or layer, it can be directly on, connected to, coupled to, or adjacent to the other element or layer, or one or more intervening elements or layers may be present. When an element or layer is referred to as being "directly on," "directly connected to", or "immediately adjacent to" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, and 35 U.S.C. § 132(a).

What is claimed is:

1. A method of manufacturing a protection film comprising:
    injecting a foaming gas into a unitary base material;
    performing a first foaming of a first part of the unitary base material on a substrate to form a bumper layer having first bubbles foamed with a first foaming ratio; and
    performing a second foaming of a second part of the unitary base material to form a light blocking layer having second bubbles foamed with a second foaming ratio different from the first foaming ratio,
    wherein the performing of the first and second foamings use expansion of the foaming gas.

2. The method of claim 1,
    wherein the performing of the first foaming comprises heating the first part at a first temperature, and
    wherein the performing of the second foaming comprises heating the second part at a second temperature different from the first temperature.

3. The method of claim 2,
    wherein the first part comprises a top surface of the unitary base material, the second part comprises a bottom surface of the unitary base material, and
    wherein the performing of the first foaming comprises providing heat corresponding to the first temperature to the first part, and the performing of the second foaming comprises providing heat corresponding to the second temperature to the second part.

4. The method of claim 2, further comprises forming an embossed (EMBO) pattern on a surface of the light blocking layer,
    wherein the EMBO pattern has an uneven shape defined by grooves recessed from the surface of the light blocking layer and protrusions defined between the grooves.

5. The method of claim 4,
    wherein the performing of the first foaming comprises performing first curing the first part,
    wherein the performing of the second foaming comprises performing second curing the second part,
    wherein the performing of the first curing comprises heating the first part to a third temperature, and
    wherein the performing of the second curing comprises heating the second part to a fourth temperature different from the third temperature.

6. The method of claim 5,
    wherein a top surface of the substrate comprises a mold corresponding to the EMBO pattern, and
    wherein the forming of the EMBO pattern is performed by casting a bottom surface of the second part by using the mold during the performing of the second curing.

7. The method of claim 4,
    wherein the bumper layer has a first density, and
    wherein the light blocking layer has a second density different from the first density.

8. The method of claim 7, wherein the first density is less than the second density.

9. The method of claim 4, wherein the first foaming ratio is greater than the second foaming ratio.

10. The method of claim 9, wherein an average volume of the first bubbles is greater than that of the second bubbles.

11. The method of claim 4, wherein the first temperature is greater than the second temperature.

12. The method of claim 1, wherein a transmittance of the light blocking layer is less than that of the bumper layer.

13. The method of claim 12, wherein the light blocking layer has transmittance of about 10% or less.

14. The method of claim 1, wherein the foaming gas comprises an inert gas.

15. The method of claim 1, wherein the first bubbles have an open-cell structure, and
    wherein in the performing of the first foaming, at least two first bubbles of the first bubbles are connected to each other, and a passage through the at least two first bubbles is formed in the bumper layer.

* * * * *